(12) United States Patent
Shan

(10) Patent No.: US 12,436,564 B2
(45) Date of Patent: Oct. 7, 2025

(54) DISPLAY PANEL AND WEARABLE DEVICE

(71) Applicant: Wuhan China Star Optoelectronics Semiconductor Display Technology Co., Ltd., Hubei (CN)

(72) Inventor: Xinpeng Shan, Hubei (CN)

(73) Assignee: WUHAN CHINA STAR OPTOELECTRONICS SEMICONDUCTOR DISPLAY TECHNOLOGY CO., LTD, Wuhan (CN)

( * ) Notice: Subject to any disclaimer, the term of this patent is extended or adjusted under 35 U.S.C. 154(b) by 93 days.

(21) Appl. No.: 18/469,001

(22) Filed: Sep. 18, 2023

(65) Prior Publication Data

US 2024/0255990 A1  Aug. 1, 2024

(30) Foreign Application Priority Data

Jan. 31, 2023  (CN) .......................... 202310099771.X

(51) Int. Cl.
*G06F 1/16*  (2006.01)
*G04B 3/04*  (2006.01)
*G04C 23/04*  (2006.01)

(52) U.S. Cl.
CPC .............. *G06F 1/163* (2013.01); *G04B 3/04* (2013.01); *G04C 23/04* (2013.01); *G06F 1/1622* (2013.01); *G06F 1/1624* (2013.01); *G06F 1/1652* (2013.01)

(58) Field of Classification Search
CPC . G09F 9/301; G09F 9/30; G06F 1/163; G06F 1/1622; G06F 1/1624;
(Continued)

(56) References Cited

U.S. PATENT DOCUMENTS

2023/0113925 A1*  4/2023  Kang ................. G06F 21/32
                                                 361/807

FOREIGN PATENT DOCUMENTS

CN  115620615 A  *  1/2023
KR  101107127 B  *  1/2012

OTHER PUBLICATIONS

Machine Translation of CN115620615A (Year: 2025).*
Machine Translation of KR101107127B (Year: 2025).*

* cited by examiner

*Primary Examiner* — Allen L Parker
*Assistant Examiner* — Peter Krim
(74) *Attorney, Agent, or Firm* — Nathan & Associates Patent Agents Ltd.; Menachem Nathan

(57) ABSTRACT

A display device and a wearable device are provided, including: a middle frame assembly, including a fixed middle frame and a first sliding middle frame slidably connected, the fixed middle frame and the first sliding middle frame sliding relatively along a first direction and together enclosing a middle frame assembly cavity; a flexible display screen including a first free portion corresponding to the first sliding middle frame, with the first free portion being curled and concealed; a synchronized expansion mechanism located within the middle frame assembly cavity, with a fixed pivot shaft extending along a second direction; a first transmission component, fixedly connected to the first sliding middle frame with one end and movably connected to the fixed pivot shaft with another end; and a first winding component fixedly connected to the first free portion with one end and retractably connected to the fixed pivot shaft with another end.

18 Claims, 9 Drawing Sheets

(58) Field of Classification Search
CPC .. G06F 1/1652; H05K 5/0217; G04G 17/045; G04B 3/04; G04C 23/04
See application file for complete search history.

DISPLAY PANEL AND WEARABLE DEVICE

FIELD OF DISCLOSURE

The present application relates to a field of display technology, in particular to a display panel and a wearable device.

DESCRIPTION OF RELATED ART

With the continuous advancement of technology, users' demands for mobile devices and wearable devices have become increasingly diverse. Depending on different operating environments or experiential needs, users have also put forward various requirements for the display screen size of mobile devices. In wearable devices, users desire a size and area as compact as possible while carrying them, and a display area as large as possible while using them. Foldable display panels have been developed and applied in wearable devices. They can be folded to reduce the size and area of the wearable device, and unfolded to increase the display area. However, there is a risk of creases or even breakage in flexible display screens of the foldable display devices after multiple folding and unfolding.

Therefore, there is an urgent need to provide an alternative structure to replace foldable display devices, in order to achieve the contraction and expansion of the display device.

SUMMARY OF INVENTION

The present application provides a display device and a wearable device that can replace foldable display devices, enabling the contraction and expansion of the display device.

The present application provides a display device.
The display device, including:
a middle frame assembly, including a fixed middle frame and a first sliding middle frame slidably connected to the fixed middle frame, wherein the fixed middle frame and the first sliding middle frame slide relatively in a first direction and form a middle frame assembly cavity, and the middle frame assembly cavity includes a fixed middle frame cavity of the fixed middle frame;
a flexible display screen, disposed on one side of the middle frame assembly and including a first free portion arranged corresponding to the first sliding middle frame, wherein the first free portion is curvable to be concealed in the middle frame assembly cavity; and
a synchronized expansion mechanism disposed within the middle frame assembly cavity, the synchronized expansion mechanism including:
a fixed pivot shaft extending along a second direction, disposed within the fixed middle frame cavity, wherein the second direction is perpendicular to the first direction;
a first transmission component, wherein one end of the first transmission component is fixedly connected to the first sliding middle frame, and an opposing end of the first transmission component is movably connected to the fixed pivot shaft; and
a first winding component, wherein one end of the first winding component is fixedly connected to the first free portion, and an opposing end of the first winding component is retractably connected to the fixed pivot shaft for winding or unwinding,
wherein when the fixed pivot shaft rotates, the first transmission component and the first winding component move in synchronous linkage, the first transmission component drives the first sliding middle frame to slide relative to the fixed middle frame in the first direction, and the first winding component drives the first free portion to wind and retract to be at least partially concealed within the middle frame assembly cavity or to expand from the middle frame assembly cavity.

Optionally, in some embodiments, the middle frame assembly further includes a second sliding middle frame; the first sliding middle frame and the second sliding middle frame are slidably connected to two opposite ends of the fixed middle frame; the first direction is a direction from the first sliding middle frame towards the second sliding middle frame; the fixed middle frame, the first sliding middle frame, and the second sliding middle frame together define the middle frame assembly cavity;
the flexible display screen further includes a second free portion arranged corresponding to the second sliding middle frame, and the second free portion is curvable to be concealed in the middle frame assembly cavity;
the synchronized expansion mechanism further includes:
a second transmission component, wherein one end of the second transmission component is fixedly connected to the second sliding middle frame, and an opposing end of the second transmission component is movably connected to the fixed pivot shaft; and
a second winding component, wherein one end of the second winding component is fixedly connected to the second free portion, and the opposing end of the second winding component is retractably connected to the fixed pivot shaft for winding or unwinding;
wherein when the fixed pivot shaft rotates, the second transmission component and the second winding component move in synchronous linkage, the second transmission component drives the second sliding middle frame to slide relative to the fixed middle frame in an opposite direction to the first sliding middle frame in the first direction, and the second winding component drives the second free portion to at least partially retract and wind to be concealed within the middle frame assembly cavity or extend from the middle frame assembly cavity.

Optionally, in some embodiments, the fixed middle frame includes a fixed upper wall, a fixed lower wall, and two fixed side walls disposed between the fixed upper wall and the fixed lower wall; the fixed upper wall, the fixed lower wall, and the fixed side walls collectively enclose the fixed middle frame cavity; the synchronized expansion mechanism is at least partially disposed within the fixed middle frame cavity; and the fixed lower wall is disposed on one side of the fixed upper wall away from the flexible display screen.

Optionally, in some embodiments, both the first sliding middle frame and the second sliding middle frame are slidably engaged with the fixed middle frame.

Optionally, in some embodiments, the first sliding middle frame includes a first sliding upper wall, a first sliding lower wall, and a first sliding side wall disposed between the first sliding upper wall and the first sliding lower wall; the first sliding lower wall and the first sliding side wall are disposed within the fixed middle frame cavity; the first sliding upper wall is disposed above the fixed upper wall;
the second sliding middle frame includes a second sliding upper wall, a second sliding lower wall, and a second sliding side wall disposed between the second sliding upper wall and the second sliding lower wall; the second sliding lower wall and the second sliding side wall are disposed outside the fixed middle frame cavity; and the second sliding upper wall is disposed above the fixed upper wall.

Optionally, in some embodiments, a surface of the fixed middle frame oriented toward the flexible display screen is provided with spaced protrusions and sliding grooves extending along the first direction and alternately arranged, the first sliding upper wall and the second sliding upper wall each include at least one first sliding rail and at least one second sliding rail extending along the first direction; and the first sliding rail and the second sliding rail cooperate with the sliding grooves, such that the least one first sliding rail and the at least one second sliding rail slide along the first direction in the sliding grooves.

Optionally, in some embodiments, the first sliding rail and the second sliding rail are alternately arranged at intervals in the sliding grooves.

Optionally, in some embodiments, top surfaces of the spaced protrusions are flush with top surfaces of the first sliding rail and the second sliding rail.

Optionally, in some embodiments, the first transmission component includes a first spur gear and a first rack, the first spur gear is fixedly sleeved on the fixed pivot shaft, one end of the first rack meshes with the first spur gear, and an opposing end of the first rack is fixedly connected to the first sliding middle frame;

the second transmission component includes a second spur gear and a second rack, the second spur gear is fixedly sleeved on the fixed pivot shaft, one end of the second rack meshes with the second spur gear, and an opposing end of the second rack is fixedly connected to the second sliding middle frame.

Optionally, in some embodiments, the first spur gear and the second spur gear are the same one spur gear, and the first rack and the second rack are respectively disposed on two sides of the same one spur gear to mesh with this spur gear.

Optionally, in some embodiments, the first transmission component and the second transmission component, sharing the same one spur gear, constitute a transmission component assembly;

the display device includes two transmission component assemblies evenly distributed along the second direction on the fixed pivot shaft.

Optionally, in some embodiments, the first winding component includes a first line groove and a first traction line, the first line groove is securely sleeved on the fixed pivot shaft, one end of the first traction line is wound in the first line groove, and another end of the first traction line is fixedly connected to the first free portion;

the second winding component includes a second line groove and a second traction line, the second line groove is securely sleeved onto the fixed pivot shaft, one end of the second traction line is wound in the second line groove, and another end of the second traction line is fixedly connected to the second free portion; and a winding direction of the first traction line in the first line groove is opposite to a winding direction of the second traction line in the second line groove.

Optionally, in some embodiments, the first line groove and the second line groove are evenly distributed along the second direction on the fixed pivot shaft.

Optionally, in some embodiments, the first winding component further includes a first winding shaft extending along the second direction, two ends of the first winding shaft are rotatably mounted on the first sliding middle frame, and the first free portion is wound around the first winding shaft;

the second winding component further includes a second winding shaft extending along the second direction, two ends of the second winding shaft are rotatably mounted on the second sliding middle frame, and the second free portion is wound around the second winding shaft.

Optionally, in some embodiments, the synchronized expansion mechanism further includes a power transmission component, the power transmission component includes a knob protruding from the fixed middle frame, one end of the power transmission component opposite to the knob is connected to the fixed pivot shaft, and when the knob is rotated, the knob drives the fixed pivot shaft to rotate.

Optionally, in some embodiments, the power transmission component further includes a first bevel gear and at least one second bevel gear disposed within the fixed middle frame cavity, the knob is connected to the fixed pivot shaft via the first bevel gear and the at least one second bevel gear, the first bevel gear is disposed between the fixed pivot shaft and the fixed lower wall, the fixed lower wall includes a through hole, the knob is inserted through the through hole and fixedly connected to the first bevel gear, the second bevel gear is sleeved on the fixed pivot shaft, the second bevel gear meshes with the first bevel gear, and a center axis of the first bevel gear and a center axis of the second bevel gear are perpendicular to each other.

Optionally, in some embodiments, the power transmission component includes two second bevel gears, and the two second bevel gears are symmetrically positioned on two sides of the center axis of the first bevel gear.

Optionally, in some embodiments, the power transmission component further includes a carrying plate, the knob is disposed between the carrying plate and the fixed lower wall, the knob is rotatably connected to the carrying plate, and a rotational axis of the knob is perpendicular to a surface of the carrying plate close the fixed pivot shaft and a surface of the fixed lower wall close the carrying plate.

Optionally, in some embodiments, the display device is an electronic watch, and the electronic watch includes a watch strap and a watch dial, and the carrying plate is the watch dial.

Accordingly, the present application further provides a wearable device, including the display device mentioned above.

The present application provides a display device and a wearable device. The display device, including: a middle frame assembly, including a fixed middle frame and a first sliding middle frame slidably connected to the fixed middle frame, wherein the fixed middle frame and the first sliding middle frame slide relatively in a first direction and form a middle frame assembly cavity, and the middle frame assembly cavity comprises a fixed middle frame cavity of the fixed middle frame; a flexible display screen, disposed on one side of the middle frame assembly and comprising a first free portion arranged corresponding to the first sliding middle frame, wherein the first free portion is curvable to be concealed in the middle frame assembly cavity; and a synchronized expansion mechanism disposed within the middle frame assembly cavity, the synchronized expansion mechanism including: a fixed pivot shaft extending along a second direction, disposed within the fixed middle frame cavity, wherein the second direction is perpendicular to the first direction; a first transmission component, wherein one end of the first transmission component is fixedly connected to the first sliding middle frame, and an opposing end of the first transmission component is movably connected to the fixed pivot shaft; and a first winding component, wherein one end of the first winding component is fixedly connected to the first free portion, and an opposing end of the first winding component is retractably connected to the fixed pivot shaft, wherein when the fixed pivot shaft rotates, the first transmission component and the first winding component move in synchronous linkage, the first transmission component drives the first sliding middle frame to slide relative to the fixed middle frame in the first direction, and the first winding component drives the first free portion to wind and retract to be at least partially concealed within the middle frame assembly cavity or to expand from the middle frame assembly cavity. In the present application, the synchronized expansion mechanism enables the middle frame assembly and the flexible display screen to expand or collapse synchronously. When the display device is collapsed, the first free portion can be at least partially concealed within the middle frame assembly cavity, thereby reducing a display area of the flexible display screen. When the display device is expanded, the first free portion is at least partially exposed from the middle frame assembly cavity, thereby increasing the display area of the flexible display screen. The display device of the present application achieves an increase in the display area to provide users with an enhanced visual experience, and also achieves a reduction in the display area for portability. Unlike foldable display devices, there is no issue of repeated folding leading to creases. Therefore, the present application can replace foldable display devices and offer a superior display effect. Also, in some conventional display devices, a flexible display screen and a middle frame assembly fold and unfold, or collapse and expand, independently, leading to size mismatches during folding/unfolding or collapsing/expanding of the flexible display screen and the middle frame assembly, and unnecessary tension on the flexible display screen due to the middle frame assembly. This mismatch can result in cracking, breakage, or uneven display surfaces. In contrast, in the present application, the synchronized expansion mechanism allows the middle frame assembly and the flexible display screen to expand and collapse in a synchronous and linked manner. The middle frame assembly and the flexible display screen expand and collapse in linked movement, by means of the fixed pivot shaft of the synchronized expansion mechanism. Consequently, the dimensions are aligned during expanding and collapsing, and the flexible display screen is not subjected to unnecessary tension from the middle frame assembly, reducing the chances of cracking or breakage. Furthermore, the flexible display screen maintains a flat display surface throughout the expansion and collapse processes.

BRIEF DESCRIPTION OF DRAWINGS

In order to more clearly illustrate the technical solutions of the present application, the drawings that need to be used in the description of the embodiments will be briefly introduced below. Obviously, the drawings in the following description are only some of the embodiments of the present application. For those skilled in the art, other drawings can be obtained based on these drawings without creative efforts.

Figure 1:
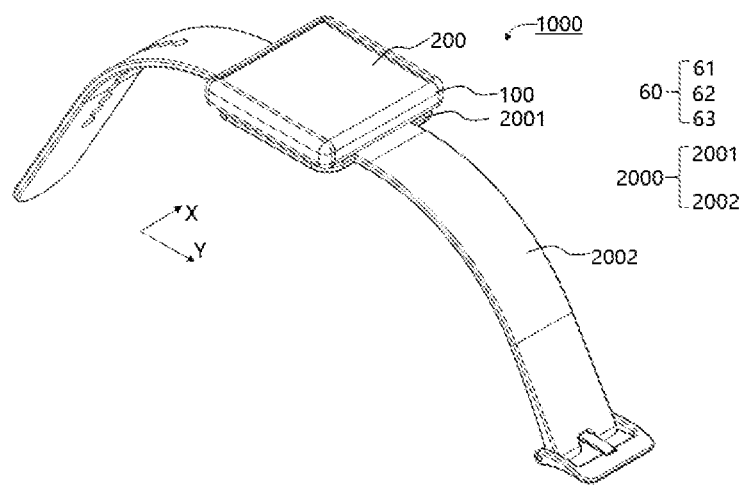
FIG. 1 is a schematic perspective view illustrating a display device in a collapsed state according to one embodiment of the present application.

Reference signs are described as follows:

display device 1000;

middle frame assembly 100, flexible display screen 200, synchronized expansion mechanism 300, middle frame assembly cavity 109;

fixed middle frame 101, first sliding middle frame 102, second sliding middle frame 103, spaced protrusions 10111, sliding grooves 10112;

first free portion 201, second free portion 202;

first sliding upper wall 1021, first sliding lower wall 1022, first sliding side wall 1023, fixed middle frame cavity 1010, first sliding rail 10211;

second sliding upper wall 1031, second sliding lower wall 1032, second sliding side wall 1033, second sliding rail 10311;

fixed pivot shaft 10, first transmission component 20, second transmission component 30, first winding component 50, second winding component 60, transmission component assembly 230;

first spur gear 22, first rack 21, second spur gear 32, second rack 31;

First line groove 51, first traction line 52, second line groove 61, second traction line 62, first winding shaft 53, second winding shaft 63;

power transmission component 80, knob 81, first bevel gear 82, second bevel gear 83, carrying plate 84;

electronic watch 2000, watch strap 2002, watch dial 2001.

DETAILED DESCRIPTION OF EMBODIMENTS

The present application is described below with reference to the accompanying drawings to clearly and completely describe the technical solutions in the embodiments of the present application. Obviously, the described embodiments are only some embodiments of the present application, rather than all the embodiments. Based on the embodiments in this present application, all other embodiments obtained by those skilled in the art without creative work shall fall within the protection scope of this present application. In addition, it should be understood that the specific embodiments described here are only used to illustrate and explain the present application, and are not used to limit the present application. In this application, unless otherwise stated, the directional terms such as "up" and "down" generally refer to orientations of the device in actual use or working state, specifically as depicted in the drawings. The terms "inner" and "outer" are used in reference to the device's outline or contour.

Figure 2:
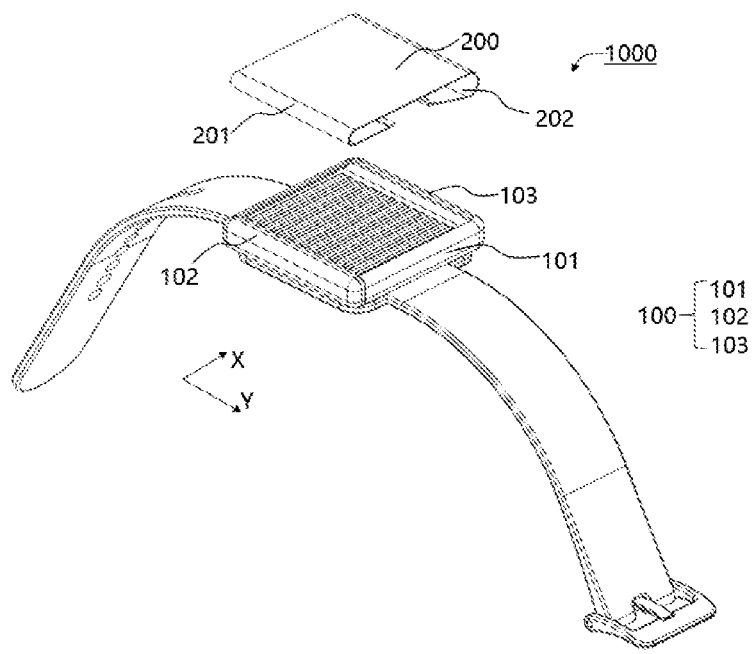
FIG. 2 is a schematic view illustrating the display device in FIG. 1 after a flexible display screen of the display device is separated.
Figure 3:
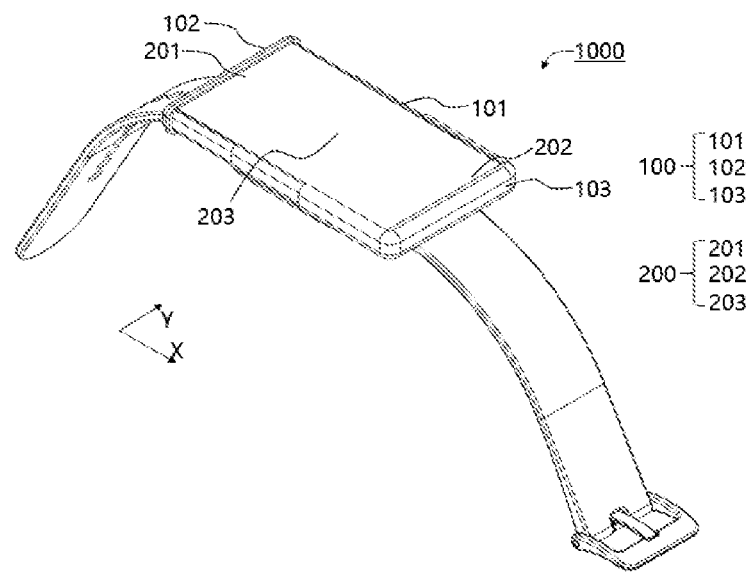
FIG. 3 is a schematic perspective view illustrating the display device in an expanded state.
Figure 4:
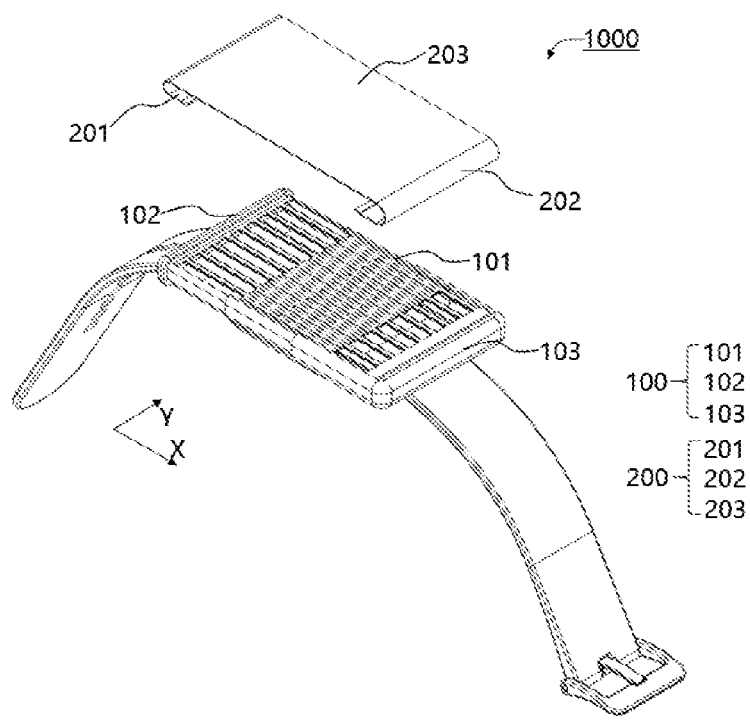
FIG. 4 is a schematic diagram illustrating the display device in FIG. 3 after the flexible display screen of the display device is separated.
Figure 5:
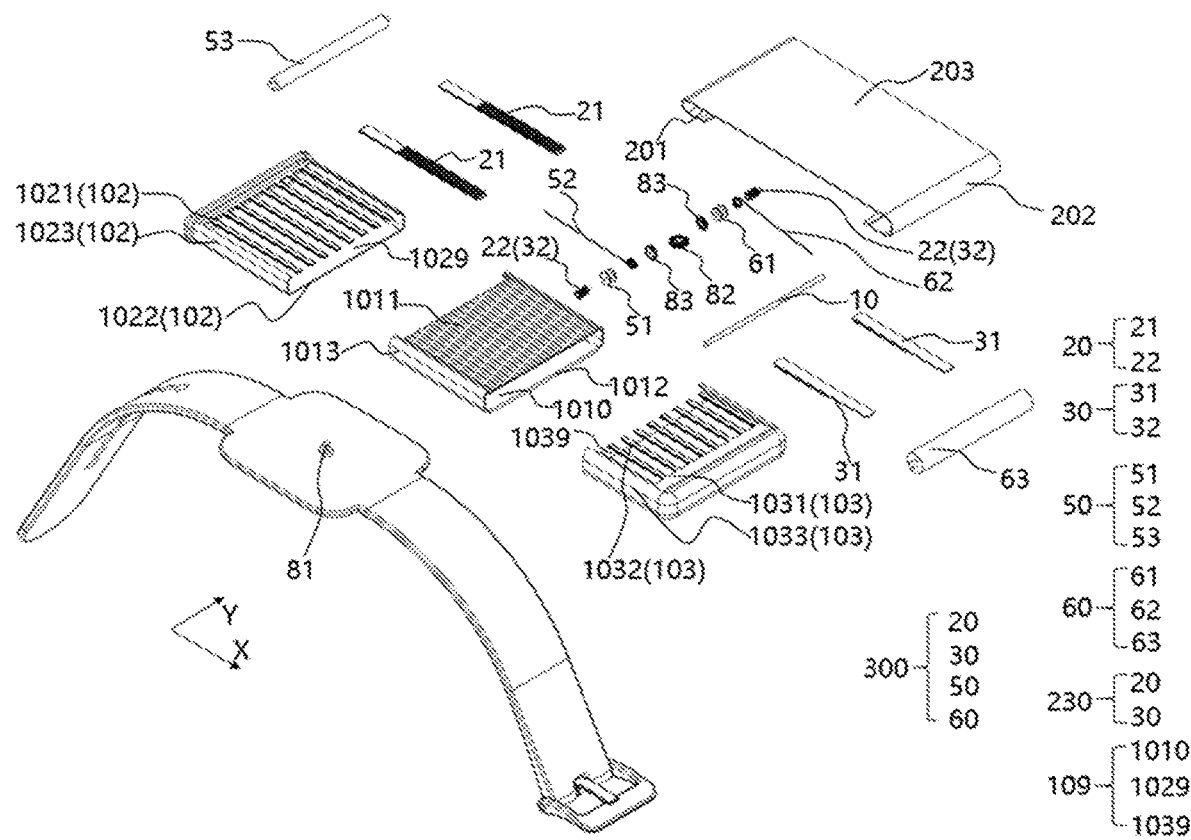
FIG. 5 is a schematic exploded view of the display device in FIG. 3.
Figure 10:
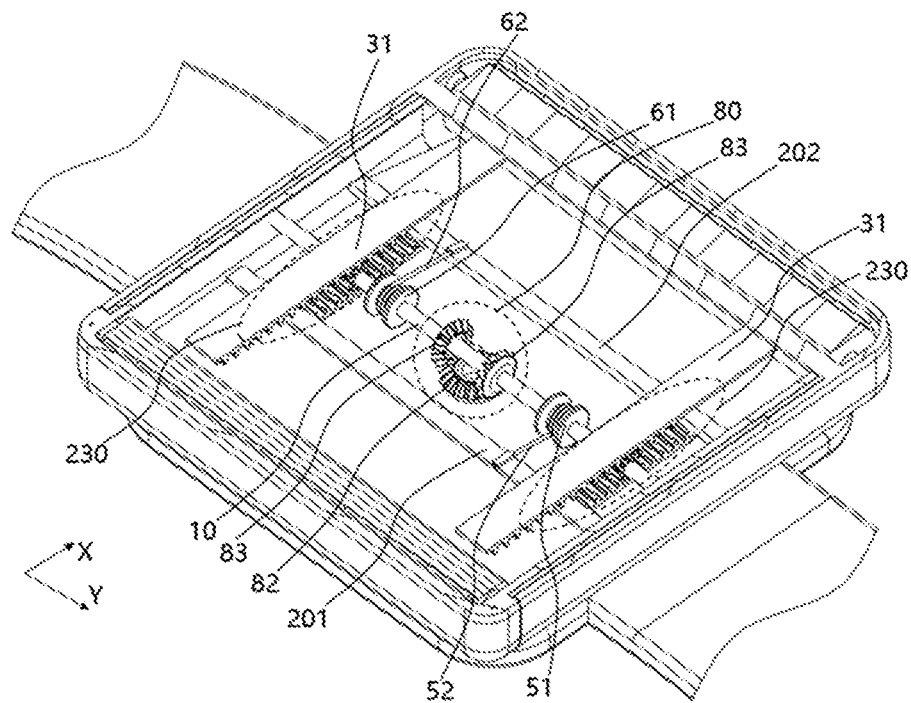
FIG. 10 is a schematic perspective view of an internal structure of the display device in FIG. 1.
Figure 11:
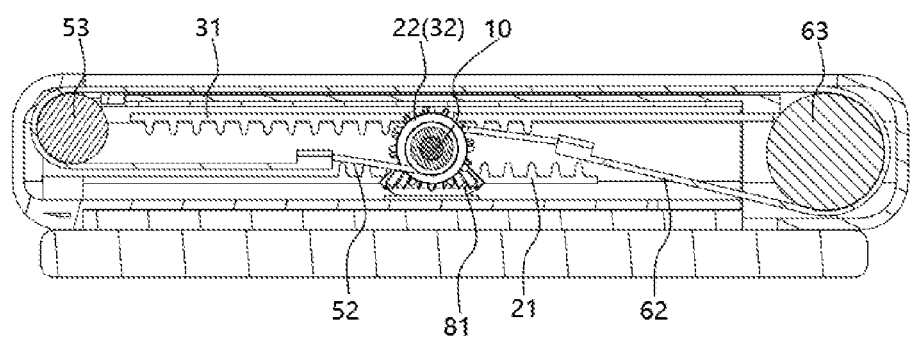
FIG. 11 is a schematic cross-sectional view of the internal structure of the display device in FIG. 1.
Figure 12:
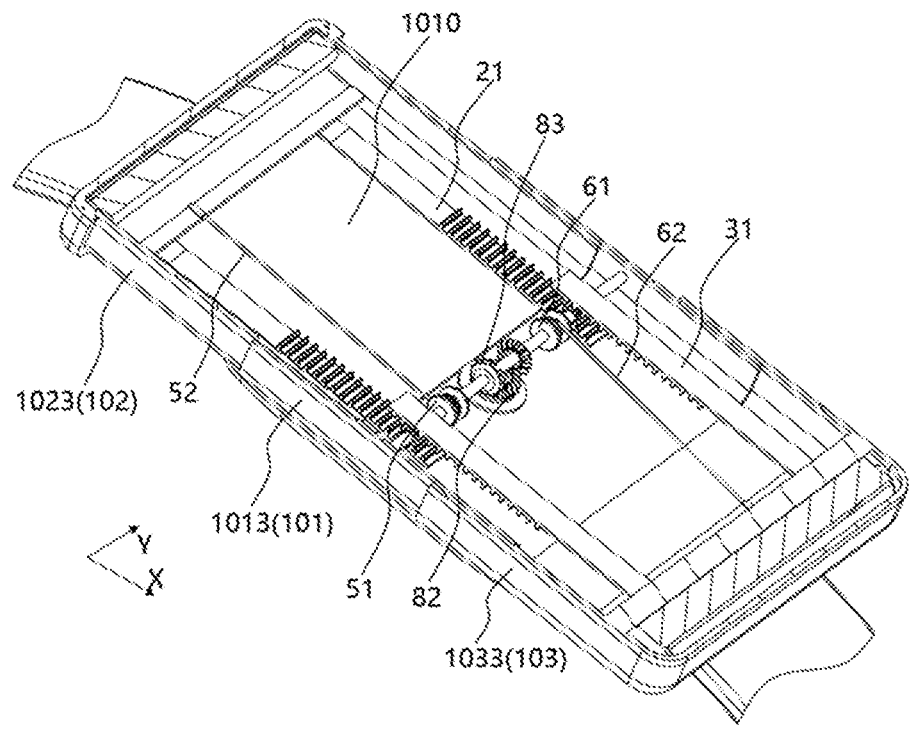
FIG. 12 is a schematic perspective view of the internal structure of the display device in FIG. 3.
Figure 13:
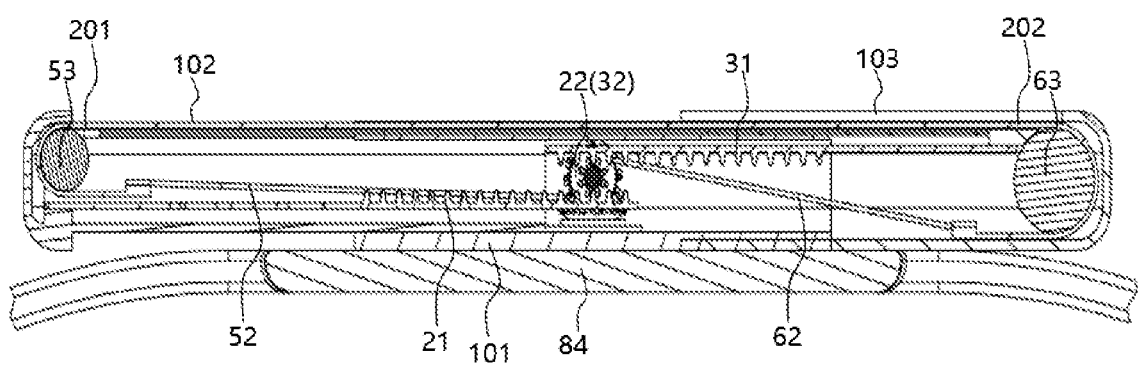
FIG. 13 is a schematic cross-sectional view of the internal structure of the display device in FIG. 3.
Figure 14:
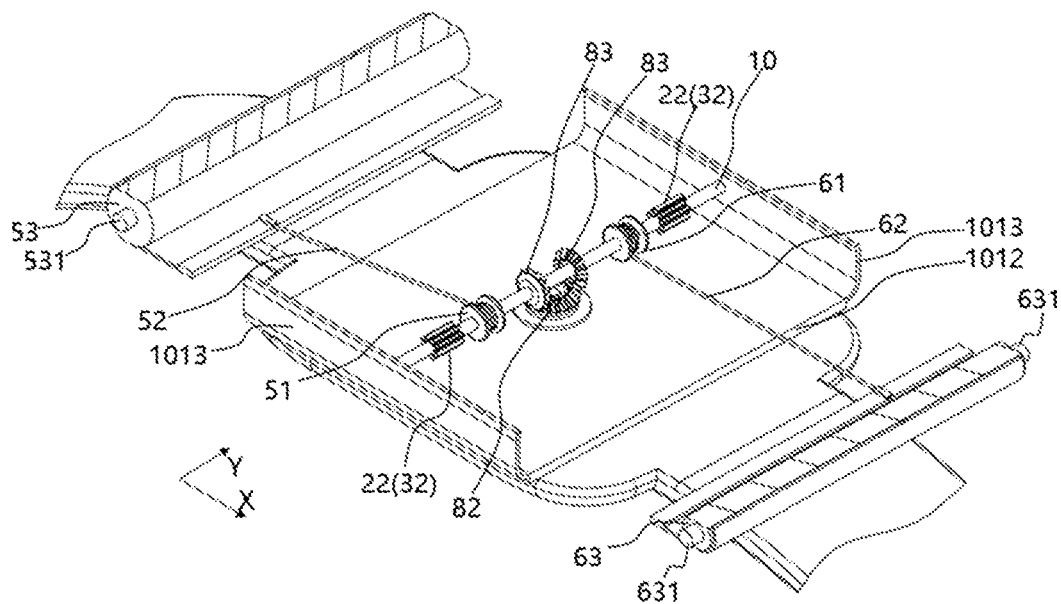
FIG. 14 is a partial structural schematic view of the internal structure in FIG. 12.
Figure 15:
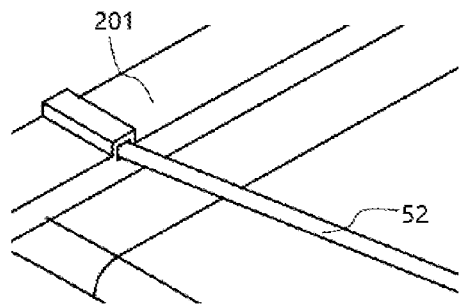
FIG. 15 is a schematic enlarged view illustrating the connection between the first traction line and the flexible display screen in FIG. 14.
Figure 16:
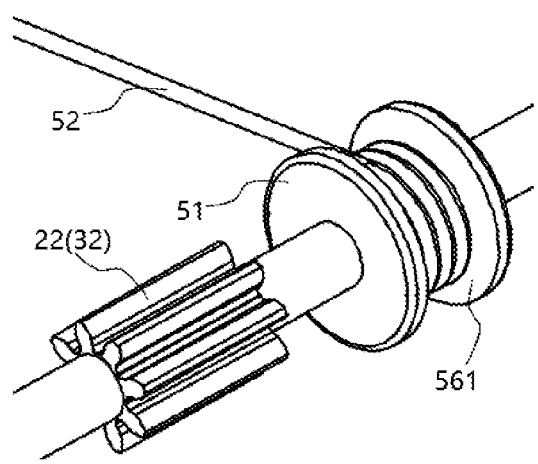
FIG. 16 is a schematic enlarged view illustrating the winding connection between the first traction line and the first line groove in FIG. 14.

Please refer to FIG. 1 to FIG. 5 and FIGS. 10 to 16. FIG. 1 is a schematic perspective view illustrating a display device in a collapsed state according to one embodiment of the present application. FIG. 2 is a schematic view illustrating the display device in FIG. 1 after a flexible display screen of the display device is separated. FIG. 3 is a schematic perspective view illustrating the display device in an expanded state. FIG. 4 is a schematic diagram illustrating the display device in FIG. 3 after the flexible display screen of the display device is separated. FIG. 5 is a schematic exploded view of the display device in FIG. 3. FIG. 10 is a schematic perspective view of an internal structure of the display device in FIG. 1. FIG. 11 is a schematic cross-sectional view of the internal structure of the display device in FIG. 1. FIG. 12 is a schematic perspective view of the internal structure of the display device in FIG. 3. FIG. 13 is a schematic cross-sectional view of the internal structure of the display device in FIG. 3. FIG. 14 is a partial structural schematic view of the internal structure in FIG. 12. FIG. 15 is a schematic enlarged view illustrating the connection between the first traction line and the flexible display screen in FIG. 14. FIG. 16 is a schematic enlarged view illustrating the winding connection between the first traction line and the first line groove in FIG. 14.

The present application provides a display device 1000. The display device includes a middle frame assembly 100, a flexible display screen 200, and a synchronized expansion mechanism 300. The middle frame assembly 100 includes a fixed middle frame 101 and a first sliding middle frame 102 slidably connected to the fixed middle frame 101. The fixed middle frame 101 and the first sliding middle frame 102 slide relatively in a first direction X. The fixed middle frame 101 and the first sliding middle frame 102 form a middle frame assembly cavity 109, within which the middle frame assembly cavity 109 includes a fixed middle frame cavity 1010 of the fixed middle frame 101. The flexible display screen 200 is disposed on one side of the middle frame assembly 100. The flexible display screen 200 comprises a first free portion 201 arranged corresponding to the first sliding middle frame 102. The first free portion 201 is curvable to be concealed in the middle frame assembly cavity 109. The synchronized expansion mechanism 300 is disposed in the middle frame assembly cavity 109 and includes a fixed pivot shaft 10, a first transmission component 20, and a first winding component 50. The fixed pivot shaft 10 extends along a second direction Y and arranged inside the fixed middle frame cavity 1010. The second direction Y is perpendicular to the first direction X. One end of the first transmission component is fixedly connected to the first sliding middle frame 102, and an opposite end of the first transmission component 20 is movably connected to the fixed pivot shaft 10. One end of the first winding component 50 is fixedly connected to the first free portion 201, and an opposite end of the first winding component 50 is connected to the fixed pivot shaft 10 for winding and unwinding. When the fixed pivot shaft 10 rotates, the first transmission component 20 and the first winding component 50 move in synchronous linkage, the first transmission component 20 drives the first sliding middle frame 102 to slide relative to the fixed middle frame 101 in the first direction X, and the first winding component 50 drives the first free portion 201 to wind and retract to be at least partially concealed within the middle frame assembly cavity 109 or to expand from the middle frame assembly cavity 109.

It should be noted that the configuration and structure of the middle frame assembly 100 of the display device 1000, which includes the fixed middle frame 101 and the first sliding middle frame 102 slidably connected to the fixed middle frame 101, are similar or identical to the subsequent embodiment of the display device 1000, where the middle frame assembly 100 further includes a second sliding middle frame 103. For the configuration and structure of the middle frame assembly 100 of the display device 1000, which includes the fixed middle frame 101 and the first sliding middle frame 102 slidably connected to the fixed middle frame 101, please refer to the subsequent embodiment, and a detailed description is omitted here.

In the present application, the synchronized expansion mechanism 300 enables the middle frame assembly 100 and the flexible display screen 200 to expand or collapse synchronously. When the display device 1000 is collapsed, the first free portion 201 can be at least partially concealed within the middle frame assembly cavity 109, thereby reducing a display area of the flexible display screen 200. When the display device 1000 is expanded, the first free portion 201 is at least partially exposed from the middle frame assembly cavity 109, thereby increasing the display area of the flexible display screen 200. The display device 1000 of the present application achieves an increase in the display area to provide users with an enhanced visual experience, and also achieves a reduction in the display area for the convenience of carrying around. Unlike foldable display devices, there is no issue of repeated folding leading to creases. Therefore, the present application can replace foldable display devices and offer a superior display effect. Also, in some conventional display devices, a flexible display screen and a middle frame assembly fold and unfold, or collapse and expand, independently, leading to size mismatches during folding/unfolding or collapsing/expanding of the flexible display screen and the middle frame assembly, and unnecessary tension on the flexible display screen due to the middle frame assembly. This mismatch can result in cracking, breakage, or uneven display surfaces. In contrast, in the present application, the synchronized expansion mechanism 300 allows the middle frame assembly 100 and the flexible display screen 200 to expand and collapse in a synchronous and linked manner. The middle frame assembly 100 and the flexible display screen 200 expand and collapse in linked movement, by means of the fixed pivot shaft 10 of the synchronized expansion mechanism 300. Consequently, the dimensions are aligned during expanding and collapsing, and the flexible display screen 200 is not subjected to unnecessary tension from the middle frame assembly 100, reducing the chances of cracking or breakage. Furthermore, the flexible display screen 200 maintains a flat display surface throughout the expansion and collapse processes.

In some embodiments, the middle frame assembly 100 further includes a second sliding middle frame 103. The first sliding middle frame 102 and the second sliding middle frame 103 are respectively slidingly connected to two opposite ends of the fixed middle frame 101. The first direction X is a direction from the first sliding middle frame 102 towards the second sliding middle frame 103. The fixed middle frame 101, the first sliding middle frame 102, and the second sliding middle frame 103 together form the middle frame assembly cavity 109. The flexible display screen 200 further includes a second free portion 202 arranged corresponding to the second sliding middle frame 103. The second free portion 202 is curvable to be concealed in the middle frame assembly cavity 109. The synchronized expansion mechanism 300 further includes a second transmission component 30 and a second winding component 60. One end of the second transmission component 30 is fixedly connected to the second sliding middle frame 103, and an opposite end of the second transmission component 30 is movably connected to the fixed pivot shaft 10. One end of the second winding component 60 is fixedly connected to the second free portion 202, and an opposite end of the second winding component 60 is connected to the fixed pivot shaft 10 for winding and rewinding. When the fixed pivot shaft 10 rotates, the second transmission component and the second winding component 60 move in synchronous linkage. The second transmission component 30 drives the second sliding middle frame 103 to slide relative to the fixed middle frame 101 in an opposite direction to the first sliding middle frame 102 in the first direction X. The second winding component 60 drives the second free portion 202 to retract and at least partially conceal within the middle frame assembly cavity 109 or to expand from the middle frame assembly cavity 109.

It should be noted that, in some embodiments, when the synchronized expansion mechanism 300 comprises the fixed pivot shaft 10, the first transmission component 20, the second transmission component 30, the first winding component 50, and the second winding component 60, the fixed pivot shaft 10 is arranged along the second direction Y and extends within the fixed middle frame cavity 1010. The second direction Y is perpendicular to the first direction X. One end of the first transmission component 20 is fixedly connected to the first sliding middle frame 102, and the opposite end of the first transmission component 20 is movably connected to the fixed pivot shaft 10. One end of the second transmission component 30 is fixedly connected to the second sliding middle frame 103, and the opposite end of the second transmission component 30 is movably connected to the fixed pivot shaft 10. One end of the first winding component 50 is fixedly connected to the first free portion 201, and the opposite end of the first winding component 50 is movably connected to the fixed pivot shaft 10 for winding and rewinding. One end of the second winding component 60 is fixedly connected to the second free portion 202, and the opposite end of the second winding component 60 is movably connected to the fixed pivot shaft 10 for winding and rewinding. When the fixed pivot shaft 10 rotates, it drives the first transmission component 20, the second transmission component 30, the first winding component 50, and the second winding component 60 to operate, thereby achieving the synchronized expansion or collapse of the middle frame assembly 100 and the flexible display screen 200.

Specifically, the fixed pivot shaft 10 is arranged along the second direction Y and extends within the fixed middle frame cavity 1010. Two opposite ends of the fixed pivot shaft are rotatably connected to two opposing fixed side walls 1013 of the fixed middle frame 101.

Specifically, one end of the first transmission component 20 is fixedly connected to the first sliding middle frame 102, and the opposite end of the first transmission component 20 is movably connected to the fixed pivot shaft 10. One end of the second transmission component 30 is fixedly connected to the second sliding middle frame 103, and the opposite end of the second transmission component 30 is movably connected to the fixed pivot shaft 10. When the fixed pivot shaft 10 rotates, it drives one end of the first transmission component 20, which is movably connected to the fixed pivot shaft 10, to move relative to the fixed pivot shaft 10 in the first direction X. Simultaneously, the rotation of the fixed pivot shaft 10 drives one end of the second transmission component 30, which is movably connected to the fixed pivot shaft 10, to move relative to the fixed pivot shaft 10 in the opposite direction to the first transmission component 20 in the first direction X. This causes the middle frame assembly 100 to expand or collapse.

Specifically, one end of the first winding component 50 is fixedly connected to the first free portion 201, and the opposite end of the first winding component 50 is connected to the fixed pivot shaft 10 for winding and rewinding. One end of the second winding component 60 is fixedly connected to the second free portion 201, and the opposite end of the second winding component 60 is connected to the fixed pivot shaft 10 for winding and rewinding. When the fixed pivot shaft rotates, it drives the end of the first winding component 50 connected to the fixed pivot shaft for winding and rewinding to collapse, and simultaneously drives the end of the second winding component 60 connected to the fixed pivot shaft 10 for winding and rewinding to collapse, resulting in the folding of the flexible display screen 200. When the fixed pivot shaft 10 reversely rotates, it drives the end of the first winding component 50 connected to the fixed pivot shaft 10 for winding and rewinding to extend, and simultaneously drives the end of the second winding component 60 connected to the fixed pivot shaft 10 for winding and rewinding to extend, resulting in the expansion of the flexible display screen 200.

Specifically, the opposite end of the first winding component 50 is connected to the fixed pivot shaft 10 for winding and rewinding, and the opposite end of the second winding component 60 is also movably connected to the fixed pivot shaft 10 for winding and rewinding. Winding and rewinding connection refers to the ability of the first winding component 50 and the second winding component 60 to collapse or extend. A distance between the fixed pivot shaft 10 and the first free portion 201, as well as a distance between the fixed pivot shaft 10 and the second free portion 202, can be decreased or increased.

Specifically, when the fixed pivot shaft 10 rotates, it simultaneously drives the first transmission component 20, the second transmission component 30, the first winding component 50, and the second winding component 60 to operate, thereby achieving the synchronized expansion or collapsing of the middle frame assembly 100 and the flexible display screen 200.

Specifically, a length direction of the fixed pivot shaft 10 extends along the second direction Y. When the fixed pivot shaft 10 rotates, its axis of rotation extends along the second direction Y.

In the present embodiment, the synchronized expansion mechanism 300 enables the middle frame assembly 100 and the flexible display screen 200 to expand and collapse synchronously. When the display device 1000 is collapsed, both the first free portion 201 and the second free portion 202 can be partially hidden within the middle frame assembly cavity 109, thereby reducing the display area of the flexible display screen 200. When the display device 1000 is expanded, both the first free portion 201 and the second free portion 202 can be partially exposed from the middle frame assembly cavity 109, thus increasing the display area of the flexible display screen 200. The display device 1000 of the present application achieves an increase in display area for an enhanced visual experience and also achieves a reduction in display area for convenient portability. Compared to foldable display devices, the present device eliminates the issue of creasing from repeated folding. Therefore, the present application can replace foldable display devices to provide enhanced display performance.

It should be noted that, in some embodiments, the display device includes a middle frame assembly 100, a flexible display screen 200, and a synchronized expansion mechanism 300. The middle frame assembly 100 comprises a fixed middle frame 101, a first sliding middle frame 102, and a second sliding middle frame 103. The first sliding middle frame 102 and the second sliding middle frame 103 are slidably connected to opposite ends of the fixed middle frame 101. A first direction X is a direction from the first sliding middle frame 102 towards the second sliding middle frame 103. The fixed middle frame 101, the first sliding middle frame 102, and the second sliding middle frame 103 collectively form a middle frame assembly cavity 109. The flexible display screen 200 is disposed on one side of the middle frame assembly 100. The flexible display screen 200 includes a first free portion 201 arranged corresponding to the first sliding middle frame 102 and a second free portion 202 arranged corresponding to the second sliding middle frame 103. The first free portion 201 and the second free portion 202 is curvable to be hidden in the middle frame assembly cavity 109. The synchronized expansion mechanism 300 is disposed in the middle frame assembly cavity 109 and facilitates the expansion and collapse of the display device 1000. During expansion of the display device 1000, the first sliding middle frame 102 and the second sliding middle frame 103 slide in opposite directions relative to the fixed middle frame 101 along the first direction X. Additionally, the first free portion 201 and the second free portion 202 partially or fully extend from within the middle frame assembly. During collapse of the display device 1000, the first sliding middle frame 102 and the second sliding middle frame 103 slide in directions towards each other relative to the fixed middle frame 101 along the first direction X. In this state, the first free portion 201 and the second free portion 202 are partially or fully concealed within the middle frame assembly.

Specifically, as shown in FIGS. 1 and 2, when the display device 1000 is collapsed, the portions of the first free portion 201 and the second free portion 202 that are curled and concealed within the middle frame assembly cavity 109 are of greater length in the first direction X, thereby reducing the display area of the flexible display screen 200. The first sliding middle frame 102 and the second sliding middle frame 103 collaborate with the fixed middle frame 101 to slide in opposite directions along the first direction X, resulting in a reduction of the length of the middle frame assembly 100 in the first direction X.

Specifically, as shown in FIGS. 3 and 4, when the display device 1000 is in the expanded state, the portions of the first free portion 201 and the second free portion 202 that are curled and concealed within the middle frame assembly cavity 109 are of reduced length in the first direction X. The first free portion 201 and the second free portion 202 extend out from the middle frame assembly 100, thereby increasing the display area of the flexible display screen 200. The first sliding middle frame 102 and the second sliding middle frame 103 collaborate with the fixed middle frame 101 to slide in opposite directions along the first direction X, resulting in an increase in the length of the middle frame assembly 100 in the first direction X.

Specifically, when the display device 1000 is collapsed, the middle frame assembly 100 and the flexible display screen 200 also collapse synchronously. When the display device 1000 is expanded, the middle frame assembly 100 and the flexible display screen 200 also expand synchronously.

Specifically, the first direction X is a direction from the first sliding middle frame 102 towards the second sliding middle frame 103, or the first direction X is a direction from an end of the first sliding middle frame 102 away from the fixed middle frame 101 to an end of the second sliding middle frame 103 away from the fixed middle frame 101. The middle frame assembly 100 folds and unfolds in the first direction X, and synchronously, the flexible display screen 200 also folds and unfolds in the first direction X, to achieve the collapse and expansion of the display device 1000 in the first direction X.

Specifically, the function of the middle frame assembly 100 also includes bearing and supporting the flexible display screen 200, as well as accommodating the synchronized expansion mechanism 300.

Specifically, the function of the synchronized expansion mechanism 300 includes enabling the simultaneous collapsing or expanding of the flexible display screen 200 and the middle frame assembly 100.

Specifically, as shown in FIG. 3, the flexible display screen 200 along the first direction X sequentially includes the first free portion 201, a flat portion 203, and the second free portion 202. The flat portion 203 is positioned between the first free portion 201 and the second free portion 202.

Specifically, when the display device 1000 is fully expanded, the first free portion 201 is arranged on or corresponding to the first sliding middle frame 102, the second free portion 202 is arranged on or corresponding to the second sliding middle frame 103, and the flat portion 203 is arranged on or corresponding to the fixed middle frame 101.

Specifically, as shown in FIG. 5, the fixed middle frame 101, the first sliding middle frame 102, and the second sliding middle frame 103 constitute the middle frame assembly cavity 109 of the middle frame assembly 100, wherein the middle frame assembly cavity 109 includes the first sliding middle frame cavity 1029 formed by the first sliding middle frame 102, the fixed middle frame cavity 1010 formed by the fixed middle frame 101, and the second sliding middle frame cavity 1039 formed by the second sliding middle frame 103.

In this embodiment, the synchronous expansion mechanism 300 enables the middle frame assembly 100 and the flexible display screen 200 to expand and collapse synchronously. When the display device 1000 is collapsed, both the first free portion 201 and the second free portion 202 can be at least partially concealed within the middle frame assembly cavity 109, thereby reducing the display area of the flexible display screen 200. When the display device 1000 is expanded, both the first free portion 201 and the second free portion 202 are at least partially exposed from the middle frame assembly cavity 109, thereby increasing the display area of the flexible display screen 200. The display device 1000 of the present application achieves an increase in the display area to provide users with an enhanced visual experience, and also achieves a reduction in the display area for portability. Unlike foldable display devices, there is no issue of repeated folding causing creases. Therefore, the present application can replace foldable display devices and achieves better display performance. Additionally, in some conventional display devices, a flexible display screen and a middle frame assembly fold and unfold, or collapse and expand, independently, resulting in mismatched dimensions during folding/unfolding or collapsing/expanding of the flexible display screen and the middle frame assembly. This mismatch can subject the flexible display screen to unnecessary tension, leading to issues like cracks, fractures, or uneven display surfaces. However, in the present application, the synchronous expansion mechanism 300 enables the middle frame assembly 100 and the flexible display screen 200 to expand and collapse in a synchronous and linked manner. The middle frame assembly 100 and the flexible display screen 200 move in synchronous linkage to achieve expansion and collapse by means of the fixed pivot shaft 10 of the synchronous expansion mechanism 300. Consequently, the dimensions are aligned during expansion and collapse, and the flexible display screen 200 is not subjected to unnecessary tension from the middle frame assembly 100, thus reducing the risk of cracks or fractures, and ensuring that the flexible display screen 200 maintains a flat and smooth display surface during expansion and collapse.

In the present embodiment, the flexible display screen 200 can increase or decrease the display area from the first free portion 201 and the second free portion 202. When the display device 1000 is collapsed, the volume of the display device 1000 is significantly reduced, enhancing portability. When the display device 1000 is expanded, the volume of the display device 1000 increases notably, providing users with an improved visual experience.

In foldable display devices, a display area in an expanded state typically doubles that in a collapsed state. In contrast, in the display device of the present embodiment of the present application, when lengths of both the first free portion 201 and the second free portion 202 in the first direction X are equal to a length of the flat portion 203 in the first direction X, the display area of the display device 1000 can expand to three times that of the collapsed state after unfolding. Consequently, compared to foldable display devices, the display device 1000 of the present application offers a significantly larger display area, while also allowing for reduction to a smaller display area.

Figure 6:
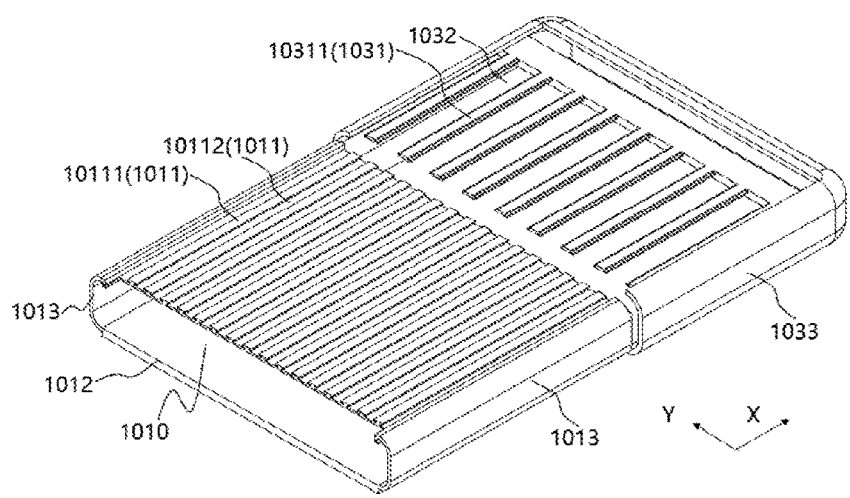
FIG. 6 is a schematic perspective view illustrating a middle frame assembly in FIG. 3.
Figure 7:
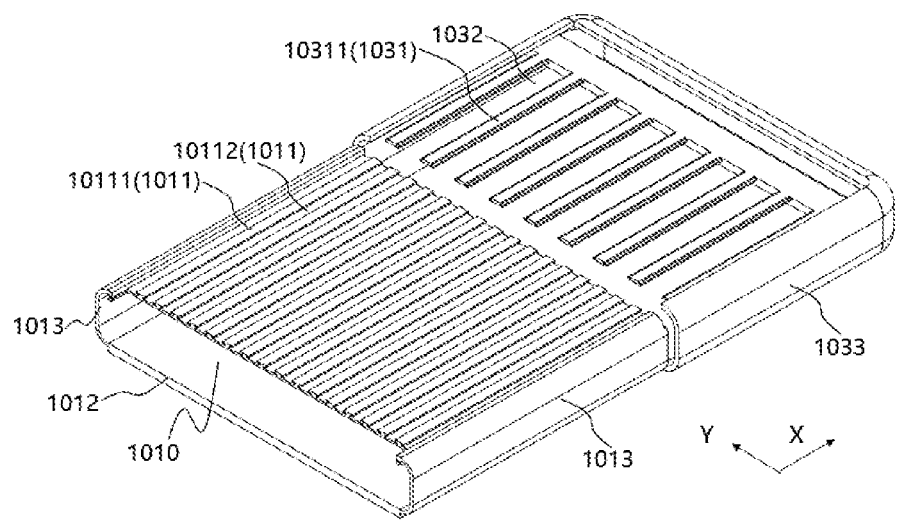
FIG. 7 is a partial structural exploded view illustrating the middle frame assembly in FIG. 6.
Figure 8:
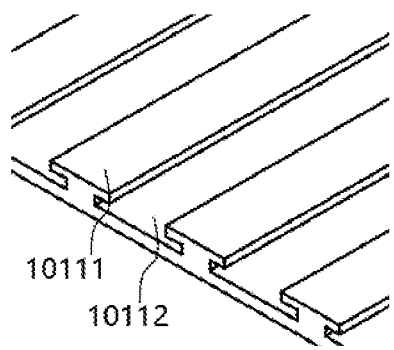
FIG. 8 is a partially enlarged schematic view of a fixed middle frame in FIG. 7.
Figure 9:
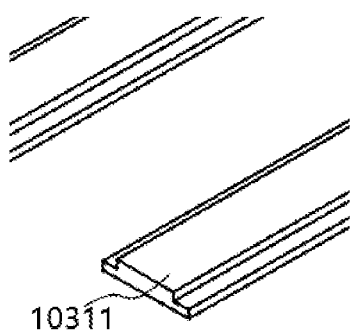
FIG. 9 is a partially enlarged schematic view of a second sliding rail in FIG. 7.

Please refer to FIGS. 5 to 9. FIG. 6 is a schematic perspective view of the middle frame assembly 100 in FIG. 3. FIG. 7 is a partial structural exploded view illustrating the middle frame assembly 100 in FIG. 6. FIG. 8 is a partially enlarged schematic view of the fixed middle frame 101 in FIG. 7. FIG. 9 is a partially enlarged schematic view of the second sliding rail in FIG. 7.

In some embodiments, the fixed middle frame 101 includes a fixed upper wall 1011, a fixed lower wall 1012, and two fixed side walls 1013 located between the fixed upper wall 1011 and the fixed lower wall 1012. The fixed upper wall 1011, the fixed lower wall 1012, and the fixed side walls 1013 enclose a fixed middle frame cavity 1010. The synchronized expansion mechanism 300 is at least partially positioned within the fixed middle frame cavity 1010, and the fixed lower wall 1012 is located on one side of the fixed upper wall 1011 away from the flexible display screen 200.

Specifically, the fixed upper wall 1011, the fixed lower wall 1012, and the fixed side walls 1013 enclose the fixed middle frame cavity 1010 to accommodate the synchronized expansion mechanism 300. The function of the fixed upper wall 1011 includes supporting the flexible display screen 200.

In some embodiments, both the first sliding middle frame 102 and the second sliding middle frame 103 are slidably engaged with the fixed middle frame 101.

Specifically, both the first sliding middle frame 102 and the second sliding middle frame 103 are slidably engaged with the fixed middle frame 101, allowing the middle frame assembly 100 to collapse and expand.

Specifically, the first sliding middle frame 102 at least partially encases the fixed middle frame 101, and the fixed middle frame 101 at least partially encases the second sliding middle frame 103. Alternatively, the first sliding middle frame 102 at least partially encases the fixed middle frame 101, and the second sliding middle frame 103 at least partially encases the fixed middle frame 101. Alternatively, the fixed middle frame 101 at least partially encases the first sliding middle frame 102, and the fixed middle frame 101 at least partially encases the second sliding middle frame 103. The engagement relationship between the first sliding middle frame 102 and the fixed middle frame 101, as well as between the second sliding middle frame 103 and the fixed middle frame 101, is not limited here, as long as the middle frame assembly 100 can collapse and expand.

In some embodiments, the first sliding middle frame 102 includes a first sliding upper wall 1021 and a first sliding lower wall 1022, as well as first sliding side walls 1023 located between the first sliding upper wall 1021 and the first sliding lower wall 1022. The first sliding lower wall 1022 and the first sliding side walls 1023 are positioned within the fixed middle frame cavity 1010, while the first sliding upper wall 1021 is positioned on the fixed upper wall 1011. The second sliding middle frame 103 includes a second sliding upper wall 1031 and a second sliding lower wall 1032, along with second sliding side walls 1033 located between the second sliding upper wall 1031 and the second sliding lower wall 1032. The second sliding lower wall 1032 and the second sliding side walls 1033 are positioned outside the fixed middle frame cavity 1010, while the second sliding upper wall 1031 is positioned on the fixed upper wall 1011.

Specifically, the first sliding lower wall 1022 and the first sliding side walls 1023 are positioned within the fixed middle frame cavity 1010, while the first sliding upper wall 1021 is positioned on the fixed upper wall 1011. Additionally, the second sliding lower wall 1032 and the second sliding side walls 1033 are positioned outside the fixed middle frame cavity 1010, and the second sliding upper wall 1031 is positioned on the fixed upper wall 1011. This configuration ensures that the first sliding middle frame 102 and the second sliding middle frame 103 do not generate collisions or other interferences with each other, allowing the middle frame assembly 100 to have a smaller length in the first direction X when collapsed and a larger length in the first direction X when expanded.

In some embodiments, as shown in FIGS. 7 to 9, a surface of the fixed middle frame 101 facing the flexible display screen 200 is provided with spaced protrusions 10111 and sliding grooves 10112 extending along the first direction X and arranged alternately. The first sliding upper wall 1021 and the second sliding upper wall 1031 each include at least one first sliding rail 10211 and at least one second sliding rail 10311 extending along the first direction X. The first sliding rail 10211 and the second sliding rail 10311 correspondingly engage with the sliding grooves 10112, allowing the first sliding rail 10211 and the second sliding rail 10311 to slide in the sliding grooves 10112 along the first direction X.

Specifically, both the first sliding rail 10211 and the second sliding rail 10311 are correspondingly engaged with the sliding grooves 10112. This arrangement allows the first sliding rail 10211 and the second sliding rail 10311 to slide along the first direction X in the sliding grooves 10112, ensuring that the first sliding middle frame 102 and the second sliding middle frame 103 can slide in opposite directions along the first direction X without any deviation in their sliding directions.

Furthermore, as shown in FIGS. 8 and 9, a cross-section of the sliding groove 10112 is in an inverted "T" shape. Shapes of the first sliding rail 10211 and the second sliding rail 10311 match the shape of the sliding groove 10112. Cross-sections of the first sliding rail 10211 and the second sliding rail 10311 are also in an inverted "T" shape. The first sliding rails 10211 and the second sliding rails 10311 are accommodated in the sliding grooves 10112, preventing any potential separation or detachment of the first sliding rails 10211 and the second sliding rails 10311 from the sliding grooves 10112.

In some embodiments, the first sliding rails 10211 and the second sliding rails 10311 are alternately and spacedly arranged in the sliding grooves 10112.

Specifically, the first sliding rails 10211 and the second sliding rails 10311 are alternately and spacedly arranged in the sliding grooves 10112. When the first sliding rails 10211 and the second sliding rails 10311 slide in directions towards each other along the first direction X in the sliding grooves 10112, no collision or interference occurs between the first sliding rail 10211 and the second sliding rail 10311, thus allowing the middle frame assembly 100 to have a lesser length in the first direction X when collapsed. The first sliding rail 10211 and the second sliding rail 10311 can have greater lengths in the sliding grooves 10112 without colliding or interfering, allowing the middle frame assembly 100 to have a greater length in the first direction X when expanded.

In some embodiments, the top surfaces of the spaced protrusions 10111 are level with the top surfaces of the first sliding rail 10211 and the second sliding rail 10311.

Specifically, the top surfaces of the spaced protrusions 10111 are level with the top surfaces of the first sliding rails 10211 and the second sliding rails 10311, meaning that the top surfaces of the spaced protrusions 10111, the top surface of the first sliding rail 10211, and the top surface of the second sliding rail 10311 are in the same plane. This provides a flat supporting surface for supporting the flexible display screen 200, ensuring that the flexible display screen 200 has a smooth display surface.

Please refer to FIGS. 5, 10 to 16.

In some embodiments, the first transmission component 20 includes a first spur gear 22 and a first rack 21. The first spur gear 22 is fixedly sleeved on the fixed pivot shaft 10. One end of the first rack 21 meshes with the first spur gear 22. Another end of the first rack 21 is securely connected to the first sliding middle frame 102. The second transmission component 30 includes a second spur gear 32 and a second rack 31. The second spur gear 32 is fixedly sleeved on the fixed pivot shaft 10, and one end of the second rack 31 meshes with the second spur gear 32. Another end of the second rack 31 is securely connected to the second sliding middle frame 103.

Specifically, a surface of the first rack 21 facing the first spur gear 22 is provided with teeth that match and engage with the first spur gear 22. A surface of the second rack 31 facing the second spur gear 32 is provided with teeth that match and engage with the second spur gear 32. When the fixed pivot shaft 10 rotates, it drives the rotation of the first spur gear 22 and the second spur gear 32. As shown in FIGS. 10 to 13, the first rack 21 and the second rack 31 move in opposite directions along the first direction X relative to the fixed pivot shaft 10. This causes the first sliding middle frame 102 and the second sliding middle frame 103 to move in opposite directions along the first direction X, thereby expanding or collapsing the middle frame assembly 100.

In some embodiments, as shown in FIGS. 11 and 13, the first spur gear 22 and the second spur gear 32 are the same one spur gear. The first rack 21 and the second rack 31 are respectively engaged with the same one spur gear on both sides of this spur gear.

Specifically, the first spur gear 22 and the second spur gear 32 are the same one spur gear. This reduces the number of spur gears and the space occupied by gears in the fixed middle frame cavity 1010. In this configuration, the first rack 21 and the second rack 31 are respectively engaged with the same one spur gear on both sides of this spur gear, and there is no contact collision or interference between the first rack 21 and the second rack 31.

In some embodiments, the first transmission component 20 and the second transmission component 30, which share the same spur gear, form a transmission component assembly 230. The display device 1000 comprises two transmission component assemblies 230. The two transmission component assemblies 230 are evenly distributed along the second direction Y on the fixed pivot shaft.

Specifically, as shown in FIG. 10, the two transmission component assemblies 230 are evenly distributed along the second direction Y on the fixed pivot shaft, providing uniform forces for the expansion or collapse of both the first sliding middle frame 102 and the second sliding middle frame 103.

Please refer to FIGS. 5, 10 to 16.

In some embodiments, the first winding component 50 comprises a first line groove 51 and a first traction line 52. The first line groove 51 is fixedly sleeved on the fixed pivot shaft 10. One end of the first traction line 52 is wound in the first line groove 51, while another end of the first traction line 52 is fixedly connected to the first free portion 201. The second winding component 60 comprises a second line groove 61 and a second traction line 62. The second line groove 61 is fixedly sleeved on the fixed pivot shaft 10. One end of the second traction line 62 is wound in the second line groove 61, while another end of the second traction line 62 is fixedly connected to the second free portion 202. A winding direction of the first traction line 52 in the first line groove 51 is opposite to a winding direction of the second traction line 62 in the second line groove 61.

Specifically, both the first line groove 51 and the second line groove 61 comprise a recess 561 set on a circumferential wall. One end of the first traction line 52 is wound within the recess 561 of the first line groove 51, and one end of the second traction line 62 is wound within the recess 561 of the second line groove 61. This design restricts winding positions of the first traction line 52 and the second traction line 62.

More specifically, one end of the first traction line 52 is wound within the first line groove 51. As shown in FIGS. 10 through 13, when the fixed pivot shaft 10 rotates, it drives the first line groove 51 to rotate, causing the first traction line 52 to retract or extend in the first line groove 51. In other words, the first traction line 52 can retract or extend in the first line groove 51.

Specifically, one end of the second traction line 62 is wound within the second line groove 61. As shown in FIGS.

10 through 13, when the fixed pivot shaft 10 rotates, it drives the second line groove 61 to rotate, causing the second traction line 62 to retract or extend in the second line groove 61. In other words, the second traction line 62 can retract or extend in the second line groove 61.

Specifically, the winding direction of the first traction line 52 within the first line groove 51 is opposite to the winding direction of the second traction line 62 within the second line groove 61. This arrangement enables simultaneous contraction or extension of the first traction line 52 within the first line groove 51 and the second traction line 62 within the second line groove 61 when the fixed pivot shaft 10 rotates. This achieves the collapsing or expanding of the display device 1000 and the flexible display screen 200.

Furthermore, the first line groove 51 and the second line groove 61 are evenly distributed along the second direction on the fixed pivot shaft.

Specifically, the first line groove 51 and the second line groove 61 are evenly distributed along the second direction on the fixed pivot shaft, ensuring uniform tension on the flexible display screen 200.

In some embodiments, the first winding component 50 further includes a first winding shaft 53 extending along the second direction Y. Two opposite ends of the first winding shaft 53 are rotatably positioned on the first sliding middle frame 102. The first free portion 201 is wound around the first winding shaft 53. The second winding component 60 further includes a second winding shaft 63 extending along the second direction Y. Two opposite ends of the second winding shaft 63 are rotatably positioned on the second sliding middle frame 103. The second free portion 202 is wound around the second winding shaft 63.

Specifically, the two opposite ends of the first winding shaft 53 are rotatably positioned on the first sliding middle frame 102. The two first opposite ends 531 of the first winding shaft 53 are rotatably mounted on the respective two first sliding side walls 1023. A length direction of the first winding shaft 53 is in the second direction Y, and a rotational axis of the first winding shaft 53 extends along the second direction Y.

In detail, the two opposite ends of the second winding shaft 63 are rotatably positioned on the second sliding middle frame 103. The two second opposite ends 631 of the second winding shaft 63 are rotatably mounted on the respective two second sliding side walls 1033. A length direction of the second winding shaft 63 is also in the second direction Y, and the rotational axis of the second winding shaft 63 extends along the second direction Y.

Specifically, the arrangement of the first winding shaft 53 and the second winding shaft 63 reduces the friction and resistance experienced by the flexible display screen 200 during the collapsing or expanding process.

Figure 17:
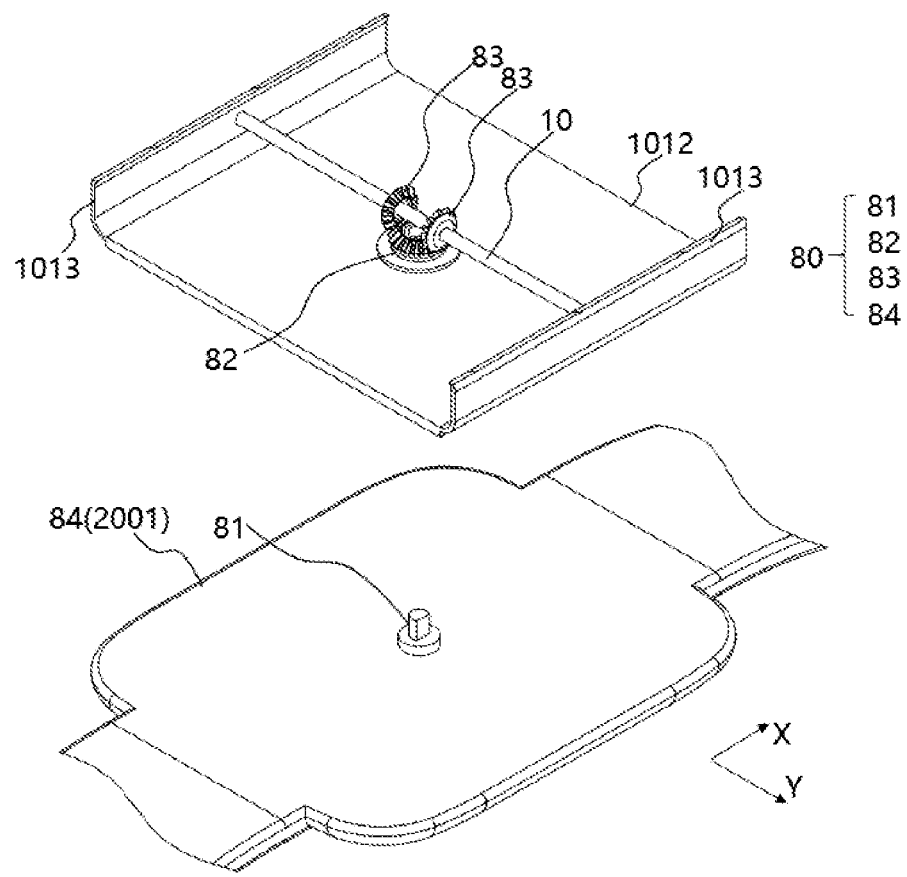
FIG. 17 is a first exploded schematic view of the power transmission component in FIG. 10.
Figure 18:
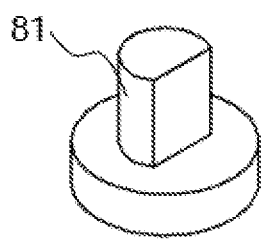
FIG. 18 is a schematic enlarged view of a structure of the knob in FIG. 17.
Figure 19:
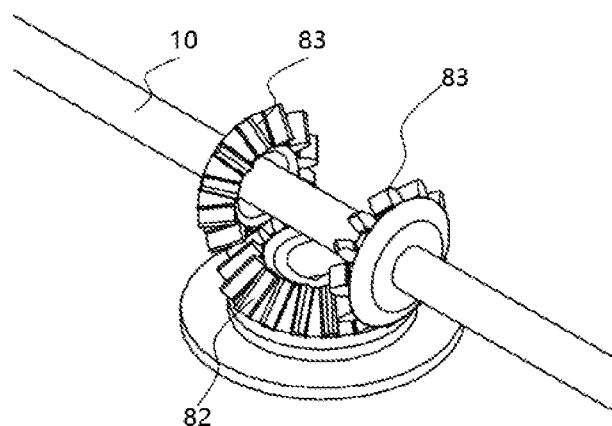
FIG. 19 is a schematic enlarged view of a partial structure of the power transmission component in FIG. 17.
Figure 20:
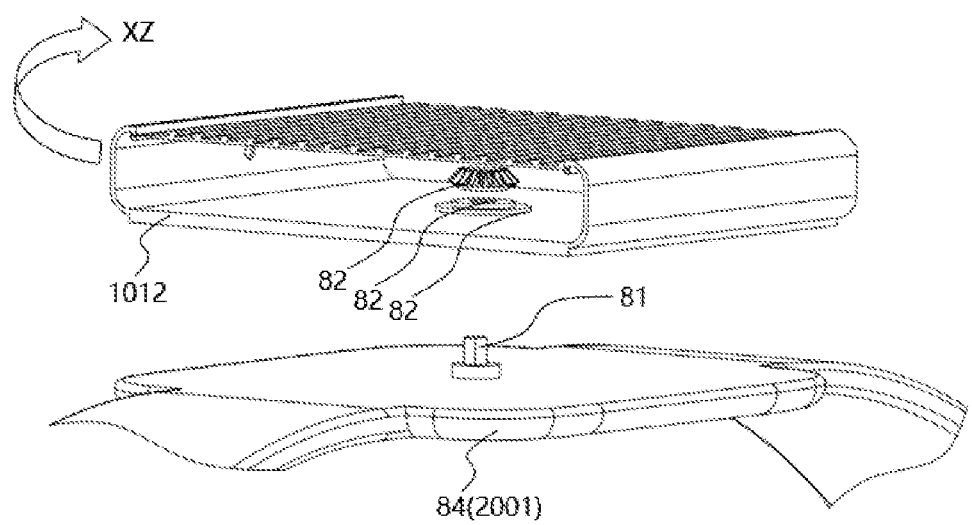
FIG. 20 is a second exploded schematic view of the power transmission component in FIG. 10.

Please refer to FIG. 5, FIG. 10, FIG. 12, FIG. 14, and FIGS. 17 to 20. FIG. 10 provides an illustration of various components within the fixed middle frame cavity 1010, including the first transmission component 20, the second transmission component 30, the first winding component 50, the second winding component 60, and the power transmission component 80. FIG. 17 depicts a first exploded view of the power transmission component shown in FIG. 10. FIG. 18 is an enlarged view of the knob in FIG. 17. FIG. 19 is an enlarged partial view of the power transmission component in FIG. 17. FIG. 20 presents a second exploded view of the power transmission component shown in FIG. 10.

In some embodiments, the synchronized expansion mechanism 300 further includes a power transmission component 80. The power transmission component 80 comprises a knob 81 that protrudes from the fixed middle frame 101. One end of the power transmission component 80, opposite the knob 81, is connected to the fixed pivot shaft 10. When the knob 81 is turned, it drives the rotation of the fixed pivot shaft 10.

Specifically, the power transmission component 80 comprises the knob 81 that extends from the fixed middle frame 101. When the knob 81 is turned, it drives the rotation of the fixed pivot shaft 10. The force applied to turn the knob 81 can come from external force, electric power, or other sources, such as a user's manipulation with fingers.

In some embodiments, the power transmission component 80 further comprises a first bevel gear 82 and at least one second bevel gear 83, both positioned within the fixed middle frame cavity 1010. The knob 81 is connected to the fixed pivot shaft 10 through the first bevel gear 82 and the second bevel gear 83. The first bevel gear 82 is located between the fixed pivot shaft 10 and the fixed lower wall 1012. The fixed lower wall includes a through hole 801. The knob 81 is securely connected to the first bevel gear 82 through the through hole 801, while the second bevel gear 83 is sleeved on the fixed pivot shaft 10. The second bevel gear 82 and the first bevel gear 83 engage with each other. A center axis of the first bevel gear 82 is perpendicular to a center axis of the second bevel gear 83.

Specifically, at least one second bevel gear 83 is securely sleeved on the fixed pivot shaft 10. The first bevel gear 82 meshes with the second bevel gear 83. The center axis of the first bevel gear 82 is perpendicular to the center axis of the second bevel gear 83, and the first bevel gear 82 is positioned between the fixed pivot shaft 10 and the fixed lower wall 1012.

Specifically, the fixed lower wall 1012 includes a through hole through which the knob 81 is securely connected to the first bevel gear 82 and protrudes from the fixed lower wall 1012. The rotation axis of the knob 81 is perpendicular to the fixed pivot shaft 10, and parallel to the center axis of the first bevel gear 82. When the knob 81 is rotated, it drives the first bevel gear 82 to rotate, subsequently driving the second bevel gear 83 to rotate, and ultimately driving the fixed pivot shaft 10 to rotate. This configuration allows the knob 81 to drive the rotation of the fixed pivot shaft 10, thus achieving the collapse or expansion of the display device 1000.

In some embodiments, the power transmission component 80 includes two second bevel gears 83 symmetrically positioned on two sides of the center axis of the first bevel gear 82.

Specifically, as shown in FIG. 17, the two second bevel gears 83 are symmetrically positioned on two sides of the center axis of the first bevel gear 82, ensuring uniform rotational force applied to the fixed pivot shaft 10.

In some embodiments, the power transmission component 80 further includes a carrying plate 84. The knob 81 is disposed between the carrying plate 84 and the fixed lower wall 1012. The knob 81 is rotatably connected to the carrying plate 84, and the rotational axis of the knob 81 is perpendicular to a surface of the carrying plate 84 close to the fixed pivot shaft 10, as well as to the surface of the fixed lower wall 1012 close to the carrying plate 84.

Specifically, the function of the carrying plate 84 is to carry the middle frame assembly 100 and secure the position of the knob 81. The knob 81 is fixed in a rotatable manner on the carrying plate 84. The rotational axis of the knob 81 is perpendicular to the surface of the carrying plate 84 close to the fixed pivot shaft 10.

Furthermore, the knob 81 can be fixed connected to the first bevel gear 82, or the knob 81 can be detachably fixed to the first bevel gear 82. In the case of a detachable connection between the knob 81 and the first bevel gear 82, as illustrated in FIG. 17, the first bevel gear 82 can be disassembled in a direction perpendicular to the surface of the carrying plate 84 close to the fixed pivot shaft 10. A cross-section of an end of the knob 81 that connects to the first bevel gear 82 has a non-circular shape. The surface of the first bevel gear 82 near the carrying plate 84 can have a corresponding indentation that matches the shape of the end of the knob 81 connecting to the first bevel gear 82. This allows the end of the knob 81 connecting to the first bevel gear 82 to be inserted into the indentation of the first bevel gear 82, thereby securely fixing the first bevel gear 82 in both the first direction X and the second direction Y.

Specifically, it should be noted that collapse and expansion of the display device 1000 are shown in FIGS. 1 to 4, FIGS. 10 to 13, FIG. 17, and FIG. 20. Users manipulate the structure above the carrying plate 84 by using their fingers to rotate the display device 1000. That is to say, users use their fingers to rotate the middle frame assembly 100 and the flexible display screen 200. As depicted in a first rotational direction XZ shown in FIG. 20, the middle frame assembly 100 and the flexible display screen 200 are rotated clockwise or counterclockwise relative to the carrying plate 84. For instance, the middle frame assembly 100 and the flexible display screen 200 rotate in the first rotational direction XZ, which in turn drives the rotation of the knob 81. The rotation axis of the knob 81 is perpendicular to the surface of the carrying plate 84 close to the fixed pivot shaft 10. The rotation of the knob 81 drives the rotation of the first bevel gear 82, with the rotation direction of the first bevel gear 82 being the same as the rotation direction of the middle frame assembly 100 and the flexible display 200. The rotation of the first bevel gear 82 drives the rotation of the second bevel gear 83, the fixed pivot shaft 10, the first spur gear 22, the second spur gear 32, the first line groove 51, and the second line groove 61. This rotation, in turn, drives the first rack 21 and second rack 31 to move in opposite directions relative to the fixed pivot shaft 10 in the first direction X. Simultaneously, the rotation drives the retraction and extension of the first traction line 52 within the first line groove 51 and the retraction and extension of the second traction line 62 within the second line groove 61. The movement of the first rack 21 and the second rack 31 respectively causes the first sliding middle frame 102 and the second sliding middle frame 103 to move in opposite directions in the first direction X to collapse or expand. The first traction line 52 and second traction line 62 respectively cause the first free portion 201 and second free portion 202 to wind or unwind. This ultimately accomplishes the collapsing or expanding of the display device 1000.

Please refer to FIGS. 1 to 4, FIG. 17, and FIG. 20.

In some embodiments, the display device 1000 is an electronic watch 2000, wherein the electronic watch 2000 includes a watch strap 2002 and a watch dial 2001. The carrying plate 84 is repurposed as the watch dial 2001.

Correspondingly, the present application also provides a wearable device, wherein the wearable device comprises any one of the aforementioned display devices 1000.

Specifically, the wearable device can be an electronic watch, a smartphone, and the like.

It should be noted that FIGS. 1 and 2 illustrate the collapsed state of the display device, while FIGS. 3 and 4 depict the expanded state of the display device. In the display device or wearable device, manipulation or rotation of structural components such as the middle frame assembly 100 and the flexible display screen 200, which are positioned on the carrying plate 84, can induce rotation of the middle frame assembly 100, the flexible display screen 200, and other structural components relative to the carrying plate 84. This rotation leads to the expansion or collapse of the display device or the wearable device. To provide a clearer illustration of this process, FIGS. 3 and 4 show a 90-degree rotation of the middle frame assembly 100, the flexible display screen 200, and other structural components relative to the carrying plate 84, as compared to FIGS. 1 and 2.

The above is a detailed description about a display panel and a wearable device according to the present application. In the present disclosure, specific examples are used to illustrate the principles and implementation of the present application. The description of the above embodiment is only for ease of understanding the present application and its main ideas. Those skilled in the art, based on the ideas of the present application, can change the embodiments and protection scope of the present application. In summary, the content of the present specification should not be construed as limiting the application.

What is claimed is:

1. A display device, comprising:
a middle frame assembly, comprising a fixed middle frame, and a first sliding middle frame and a second sliding middle frame both slidably connected to the fixed middle frame, wherein the fixed middle frame and the first sliding middle frame slide relatively in a first direction and form a middle frame assembly cavity, and the middle frame assembly cavity comprises a fixed middle frame cavity of the fixed middle frame; the first sliding middle frame and the second sliding middle frame are slidably connected to two opposite ends of the fixed middle frame; the first direction is a direction from the first sliding middle frame towards the second sliding middle frame; the fixed middle frame, the first sliding middle frame, and the second sliding middle frame together define the middle frame assembly cavity;
a flexible display screen, disposed on one side of the middle frame assembly and comprising a first free portion and a second free portion, the first free portion arranged corresponding to the first sliding middle frame, the second free portion arranged corresponding to the second sliding middle frame, wherein the first free portion and the second free portion are each curvable to be concealed in the middle frame assembly cavity; and
a synchronized expansion mechanism disposed within the middle frame assembly cavity, the synchronized expansion mechanism comprising:
a fixed pivot shaft extending along a second direction, disposed within the fixed middle frame cavity, wherein the second direction is perpendicular to the first direction;
a first transmission component, wherein one end of the first transmission component is fixedly connected to the first sliding middle frame, and an opposing end of the first transmission component is movably connected to the fixed pivot shaft;
a first winding component, wherein one end of the first winding component is fixedly connected to the first free portion, and an opposing end of the first winding component is retractably connected to the fixed pivot shaft, the first winding component comprising a first line groove and a first traction line, wherein the first line groove is securely sleeved on the fixed pivot shaft, one end of the first traction line is wound in the first line groove, and another end of the first traction line is fixedly connected to the first free portion;

a second transmission component, wherein one end of the second transmission component is fixedly connected to the second sliding middle frame, and an opposing end of the second transmission component is movably connected to the fixed pivot shaft; and a second winding component, wherein one end of the second winding component is fixedly connected to the second free portion, and an opposing end of the second winding component is retractably connected to the fixed pivot shaft, the second winding component comprising a second line groove and a second traction line, wherein the second line groove is securely sleeved onto the fixed pivot shaft, one end of the second traction line is wound in the second line groove, and another end of the second traction line is fixedly connected to the second free portion, wherein when the fixed pivot shaft rotates, the first transmission component and the first winding component move in synchronous linkage, the first transmission component drives the first sliding middle frame to slide relative to the fixed middle frame in the first direction, and the first winding component drives the first free portion to wind and retract to be at least partially concealed within the middle frame assembly cavity or to expand from the middle frame assembly cavity;

wherein when the fixed pivot shaft rotates, the second transmission component and the second winding component move in synchronous linkage, the second transmission component drives the second sliding middle frame to slide relative to the fixed middle frame in an opposite direction to the first sliding middle frame in the first direction, and the second winding component drives the second free portion to at least partially retract and wind to be concealed within the middle frame assembly cavity or extend from the middle frame assembly cavity;

wherein a winding direction of the first traction line in the first line groove is opposite to a winding direction of the second traction line in the second line groove.

2. The display device according to claim 1, wherein the fixed middle frame comprises a fixed upper wall, a fixed lower wall, and two fixed side walls disposed between the fixed upper wall and the fixed lower wall; the fixed upper wall, the fixed lower wall, and the fixed side walls collectively enclose the fixed middle frame cavity; the synchronized expansion mechanism is at least partially disposed within the fixed middle frame cavity; and the fixed lower wall is disposed on one side of the fixed upper wall away from the flexible display screen.

3. The display device according to claim 2, wherein both the first sliding middle frame and the second sliding middle frame are slidably engaged with the fixed middle frame.

4. The display device according to claim 3, wherein the first sliding middle frame comprises a first sliding upper wall, a first sliding lower wall, and a first sliding side wall disposed between the first sliding upper wall and the first sliding lower wall; the first sliding lower wall and the first sliding side wall are disposed within the fixed middle frame cavity; the first sliding upper wall is disposed above the fixed upper wall;

the second sliding middle frame comprises a second sliding upper wall, a second sliding lower wall, and a second sliding side wall disposed between the second sliding upper wall and the second sliding lower wall; the second sliding lower wall and the second sliding side wall are disposed outside the fixed middle frame cavity; and the second sliding upper wall is disposed above the fixed upper wall.

5. The display device according to claim 4, wherein a surface of the fixed middle frame oriented toward the flexible display screen is provided with spaced protrusions and sliding grooves extending along the first direction and alternately arranged, the first sliding upper wall and the second sliding upper wall each comprise at least one first sliding rail and at least one second sliding rail extending along the first direction; and the first sliding rail and the second sliding rail cooperate with the sliding grooves, such that the at least one first sliding rail and the at least one second sliding rail slide along the first direction in the sliding grooves.

6. The display device according to claim 5, wherein the first sliding rail and the second sliding rail are alternately arranged at intervals in the sliding grooves.

7. The display device according to claim 5, wherein top surfaces of the spaced protrusions are flush with top surfaces of the first sliding rail and the second sliding rail.

8. The display device according to claim 1, wherein the first transmission component comprises a first spur gear and a first rack, the first spur gear is fixedly sleeved on the fixed pivot shaft, one end of the first rack meshes with the first spur gear, and an opposing end of the first rack is fixedly connected to the first sliding middle frame;

the second transmission component comprises a second spur gear and a second rack, the second spur gear is fixedly sleeved on the fixed pivot shaft, one end of the second rack meshes with the second spur gear, and an opposing end of the second rack is fixedly connected to the second sliding middle frame.

9. The display device according to claim 8, wherein the first spur gear and the second spur gear are a same one spur gear, and the first rack and the second rack are respectively disposed on two sides of the same one spur gear to mesh with this spur gear.

10. The display device according to claim 9, wherein the first transmission component and the second transmission component, sharing the same one spur gear, constitute a transmission component assembly;

the display device comprises two transmission component assemblies evenly distributed along the second direction on the fixed pivot shaft.

11. The display device according to claim 1, wherein the first line groove and the second line groove are evenly distributed along the second direction on the fixed pivot shaft.

12. The display device according to claim 11, wherein the first winding component further comprises a first winding shaft extending along the second direction, two ends of the first winding shaft are rotatably mounted on the first sliding middle frame, and the first free portion is wound around the first winding shaft;

the second winding component further comprises a second winding shaft extending along the second direction, two ends of the second winding shaft are rotatably mounted on the second sliding middle frame, and the second free portion is wound around the second winding shaft.

13. The display device according to claim 1, wherein the synchronized expansion mechanism further comprises a power transmission component, the power transmission component comprises a knob protruding from the fixed middle frame, one end of the power transmission component opposite to the knob is connected to the fixed pivot shaft, and when the knob is rotated, the knob drives the fixed pivot shaft to rotate.

14. The display device according to claim 13, wherein the power transmission component further comprises a first bevel gear and at least one second bevel gear disposed within the fixed middle frame cavity, the knob is connected to the fixed pivot shaft via the first bevel gear and the at least one second bevel gear, the first bevel gear is disposed between the fixed pivot shaft and a fixed lower wall, the fixed lower wall comprises a through hole, the knob is inserted through the through hole and fixedly connected to the first bevel gear, the second bevel gear is sleeved on the fixed pivot shaft, the second bevel gear meshes with the first bevel gear, and a center axis of the first bevel gear and a center axis of the second bevel gear are perpendicular to each other.

15. The display device according to claim 14, wherein the power transmission component comprises two second bevel gears, and the two second bevel gears are symmetrically positioned on two sides of the center axis of the first bevel gear.

16. The display device according to claim 14, wherein the power transmission component further comprises a carrying plate, the knob is disposed between the carrying plate and the fixed lower wall, the knob is rotatably connected to the carrying plate, and a rotational axis of the knob is perpendicular to a surface of the carrying plate close the fixed pivot shaft and a surface of the fixed lower wall close the carrying plate.

17. The display device according to claim 16, wherein the display device is an electronic watch, and the electronic watch comprises a watch strap and a watch dial, and the carrying plate is the watch dial.

18. A wearable device, comprising a display device, comprising:
  a middle frame assembly, comprising a fixed middle frame, and a first sliding middle frame and a second sliding middle frame both slidably connected to the fixed middle frame, wherein the fixed middle frame and the first sliding middle frame slide relatively in a first direction and form a middle frame assembly cavity, and the middle frame assembly cavity comprises a fixed middle frame cavity of the fixed middle frame; the first sliding middle frame and the second sliding middle frame are slidably connected to two opposite ends of the fixed middle frame; the first direction is a direction from the first sliding middle frame towards the second sliding middle frame; the fixed middle frame, the first sliding middle frame, and the second sliding middle frame together define the middle frame assembly cavity;
  a flexible display screen, disposed on one side of the middle frame assembly and comprising a first free portion and a second free portion, the first free portion arranged corresponding to the first sliding middle frame, the second free portion arranged corresponding to the second sliding middle frame, wherein the first free portion and the second free portion are each curvable to be concealed in the middle frame assembly cavity; and
  a synchronized expansion mechanism disposed within the middle frame assembly cavity, the synchronized expansion mechanism comprising:
    a fixed pivot shaft extending along a second direction, disposed within the fixed middle frame cavity, wherein the second direction is perpendicular to the first direction;
    a first transmission component, wherein one end of the first transmission component is fixedly connected to the first sliding middle frame, and an opposing end of the first transmission component is movably connected to the fixed pivot shaft;
    a first winding component, wherein one end of the first winding component is fixedly connected to the first free portion, and an opposing end of the first winding component is retractably connected to the fixed pivot shaft, the first winding component comprising a first line groove and a first traction line, wherein the first line groove is securely sleeved on the fixed pivot shaft, one end of the first traction line is wound in the first line groove, and another end of the first traction line is fixedly connected to the first free portion;
    a second transmission component, wherein one end of the second transmission component is fixedly connected to the second sliding middle frame, and an opposing end of the second transmission component is movably connected to the fixed pivot shaft; and
    a second winding component, wherein one end of the second winding component is fixedly connected to the second free portion, and an opposing end of the second winding component is retractably connected to the fixed pivot shaft, the second winding component comprising a second line groove and a second traction line, wherein the second line groove is securely sleeved onto the fixed pivot shaft, one end of the second traction line is wound in the second line groove, and another end of the second traction line is fixedly connected to the second free portion,
  wherein when the fixed pivot shaft rotates, the first transmission component and the first winding component move in synchronous linkage, the first transmission component drives the first sliding middle frame to slide relative to the fixed middle frame in the first direction, and the first winding component drives the first free portion to wind and retract to be at least partially concealed within the middle frame assembly cavity or to expand from the middle frame assembly cavity;
  wherein when the fixed pivot shaft rotates, the second transmission component and the second winding component move in synchronous linkage, the second transmission component drives the second sliding middle frame to slide relative to the fixed middle frame in an opposite direction to the first sliding middle frame in the first direction, and the second winding component drives the second free portion to at least partially retract and wind to be concealed within the middle frame assembly cavity or extend from the middle frame assembly cavity;
  wherein a winding direction of the first traction line in the first line groove is opposite to a winding direction of the second traction line in the second line groove.

* * * * *